United States Patent [19]
Commeyras et al.

[11] Patent Number: 4,851,576

[45] Date of Patent: Jul. 25, 1989

[54] PROCESS FOR CATALYTIC HYDROLYSIS OF AN α-AMINO- NITRILE IN HETEROGENEOUS PHASE, AND POLYMERIC RESINS HAVING CATALYTIC ACTIVITY FOR AFFECTING THE PROCESS

[75] Inventors: Auguste A. Commeyras; Jacques R. Taillades, both of Clapiers; Jean Brugidou, Montpellier; Régine Sola, Montpellier; Aldo Previero, Montpellier; Louis Mion, Montpellier; Robert J. Pascal, Montpellier; Monique Lasperas, St Gely du Fesc; Alain Rousset, Montpellier, all of France

[73] Assignee: Centre National de la Recherche Scientifique (CNRS), Paris, France

[21] Appl. No.: 454,003

[22] Filed: Dec. 28, 1982

[30] Foreign Application Priority Data

Jan. 15, 1982 [FR] France ............................ 82 00600

[51] Int. Cl.⁴ ........................................ C07C 102/08
[52] U.S. Cl. .................................. 564/126; 564/128; 564/129
[58] Field of Search ............... 564/126, 128, 129, 198

[56] References Cited

U.S. PATENT DOCUMENTS

| | | | |
|---|---|---|---|
| 3,041,375 | 6/1962 | Heiny | 564/128 O |
| 3,062,883 | 11/1962 | Gilbert et al. | 564/126 X |
| 3,190,917 | 6/1965 | Johnson et al. | 564/129 O |
| 3,674,848 | 7/1972 | Schoenbrunn et al. | 564/126 |
| 4,036,879 | 7/1977 | Habermann | 564/126 X |
| 4,243,814 | 1/1981 | Pascal et al. | 564/198 X |

*Primary Examiner*—Robert V. Hines
*Attorney, Agent, or Firm*—Pennie & Edmonds

[57] ABSTRACT

This invention relates to a process for the catalytic hydrolysis of an α-aminonitrile in the heterogeneous phase, and to polymeric resins having a catalytic activity for carrying out the present process.

The process according to this invention is characterized in that said α-aminonitrile or one of the salts thereof is reacted in an aqueous medium, in the heterogeneous phase and in the presence of hydroxide ions on a polymeric resin which contains side chains carrying a carbonyl group, and which is insoluble in the aqueous basic medium.

28 Claims, No Drawings

PROCESS FOR CATALYTIC HYDROLYSIS OF AN α-AMINO- NITRILE IN HETEROGENEOUS PHASE, AND POLYMERIC RESINS HAVING CATALYTIC ACTIVITY FOR AFFECTING THE PROCESS

This invention relates to a process for the chemical catalytic hydrolysis of an α-aminonitrile or one of the salts thereof. According to the process of the present invention, this catalytic hydrolysis of an α-aminonitrile or one of the salts thereof may result, depending on the particular reaction conditions, either in the formation of an α-amino amide, or directly in the formation of a salt of an α-amino acid, it being possible to easily convert the latter, by simple neutralisation, into the corresponding free α-amino acid. Thus, this invention also relates in a particular manner to the preparation of α-amino acids, in the form of the racemic mixture thereof, obtained from α-aminonitrile, from the salts thereof or from the precursors thereof.

In this respect, it should be recalled that α-amino acids assume an indisputable industrial value. In fact, some of them may be used in human or animal medicine, as well as in nutrition, for example in view of completing food intake. Others may also enter, for example into the composition of soaps or cosmetics.

In the prior art, α-amino acids have been prepared from the corresponding aldehyde precursors thereof, by the Strecker reaction, or by one of the numerous modifications made to the original reaction and, in particular, by carrying out the process described in French Pat. No. 2,372,797. According to the process of this previous patent, the intermediate α-aminonitrile or one of the salts thereof is hydrolysed catalytically in a basic medium, by reacting an aqueous solution containing at least one carbonyl derivative on said α-aminonitrile or on one of the salts thereof, in the presence of hydroxide ions. However, a process of this type which is extremely selective and economically favourable, requires the separation of the carbonyl catalyst from the reaction medium and the possible recycling thereof. Moreover, in this prior art process, the choice of carbonyl catalyst is greatly restricted by the necessary stability thereof in a homogeneous basic medium.

A precise object of the present invention is to overcome these disadvantages inherent in this closest prior art process.

The process according to this invention is characterised in that an α-aminonitrile or one of the salts thereof is reacted in an aqueous medium, in the heterogeneous phase and in the presence of hydroxide ions, on a polymeric resin which comprises side chains terminated by a carbonyl group, and which is insoluble in the aqueous basic medium.

Polymeric resins carrying side chains, having a carbonyl group and capable of being partially hydrated which are also part of the object of the present application, correspond to the following general formula:

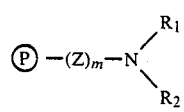

wherein

Ⓟ represents a polymeric resin matrix,

Z represents the group of formula

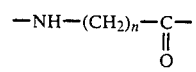

wherein $1 \leq n \leq 5$, m represents 0 or 1, $R_1$ represents a hydrogen atom, and $R_2$ represents a cycloalkanone group of from 4 to 7 members possibly comprising from 1 to 3 heteroatoms, such as nitrogen, or a group of the formula

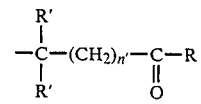

wherein:

R' represents a hydrogen atom or a methyl or ethyl radical,

R represents a methyl or ethyl radical, and n' represents 0 to 3, or $R_1$ and $R_2$ together form with the adjacent nitrogen atom a cycloalkanone group of from 5 to 7 members possibly containing 1 or 2 additional hetero atoms, such as nitrogen, and possibly being able to be substituted by one or more methyl or ethyl radicals.

According to another characteristic of the present invention, the hydroxide ions are introduced into the aqueous reaction medium in a small quantity, in a proportion of from about 0.1 to 0.3 mols per mol of starting α-aminonitrile. These reaction conditions make it possible to extract the corresponding α-amino amide which is obtained.

According to another characteristic of the present process, the hydroxide ions are introduced into the aqueous reaction medium in order to substantially attain equimolarity with respect to the starting α-aminonitrile, and these particular reaction conditions allow the extraction of the corresponding α-amino acid which is obtained.

According to another characteristic of the present process, the aqueous reaction medium has a minimum water content corresponding to 1 mol of wateer per mol of starting α-aminonitrile.

According to another additional characteristic of the hydrolysis process of the present invention, a mixture of aldehyde, hydrocyanic acid and ammonia, or a mixture of cyanohydrin and ammonia is reacted, both being starting materials for α-aminonitrile, in the presence of hydroxide ions on a polymeric resin which contains side chains terminated by a carbonyl group, and which is insoluble in the aqueous basic medium.

The process for the chemical catalytic hydrolysis according to the present invention applies in particular to α-aminonitriles corresponding to the following general formula:

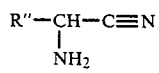

wherein the radical R" represents a hydrogen atom or a linear or branched hydrocarbon chain, containing from 1 to 12 carbon atoms and possibly one or more heteroatoms, such as sulphur, said radical R" possibly being mono- or poly-substitituted, preferably at the end of the chain, by groups such as hydroxy, amino, carboxyl, phenyl, hydroxyphenyl, carboxamide, indolyl, iminazyl and guanidyl groups, or R" forms with the nitrogen atom in the α-position a saturated heterocyclic group containing at least one heteroatom, such as nitrogen, said heterocyclic group itself being able to be substituted, for example by a hydroxy group, and the present process also applies to the salts and precursors of these αaminonitriles The process of the present invention applies in particular to α-amino-propionitrile resulting in alanine, and to α-aminomethylmercaptobutyronitrile, a precursor of methionine which is an amino acid of very great economic value, or to the salts of these nitriles, such as hydrochlorides, and to the precursors thereof.

Other characteristics and advantages of the present invention will be revealed from reading the following detailed description, notably with reference to some particular Practical Examples.

According to the process of the present invention, it is found that by introducing an α-aminonitrile or one of the salts thereof, such as hydrochloride, into an aqueous solution containing a suspension of an insoluble carbonyl polymeric resin and hydroxide ions, the α-aminoamide corresponding to the starting α-aminonitrile is obtained in a very rapid and quantitative manner, even at ambient temperature. The insoluble carbonyl resin may then be separated from the reaction medium by simple filtration or centrifugation, then recycled as it is, without a regeneration process.

Instead of being carried out in a discontinuous manner with the catalyst being recycled, the present process may also be carried out continuously by the contact of a solution of α-aminonitrile or one of the salts thereof with the insolubilized and immobilized carbonyl catalyst. According to such an advantageous variant of the present process, the α-aminonitrile is introduced, for example at the head of a tubular reactor, at the same time as a solution of hydroxide ions in a proportion of from 0.1 to 1 mol of hydroxide per mol of starting α-aminonitrile. The carbonyl polymeric resin may be immobilized, for example in the tubular reactor, and it may have a capacity of from 0.1 to 10 milliequivalents of carbonyl function per gram of catalyst. The α-amino acid may thus be directly recovered at the outlet of the reactor. It is also possible to introduce into the effluent hydroxide ions in order to achieve equimolarity with respect to the α-amino amide which is thus hydrolysed quantitatively into the corresponding α-amino acid.

The hydroxide ions are introduced into the reaction medium in the form of a hydroxide of an alkali metal or of an alkaline—earth metal, or in the form of ammonium hydroxide.

More particularly, the polymeric resins carrying side chains having a terminal carbonyl group and corresponding to the following general formulae I, II and III, without the latter being restrictive, are perfectly suitable in practice for carrying out the process according to the present invention.

The polymeric resins carrying side chains having a terminal carbonyl group of linear type correspond to the general formula I:

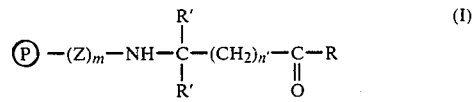

wherein:
Ⓟ represents a polymeric resin matrix,
Z represents the group of formula

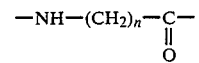

wherein $1 \leq n \leq 5$,
R' represents a hydrogen atom or a methyl or ethyl radical,
R represents a methyl or ethyl radical,
m represents 0 or 1, and
n' represents 0 to 3.

The polymeric resins carrying a carbonyl group in the form of a cycloalkanone group correspond to the general formula II:

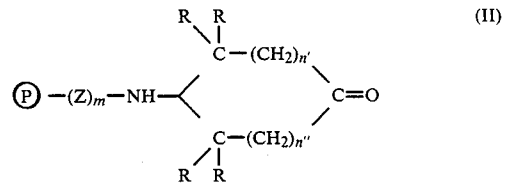

wherein:
Ⓟ represents a polymeric resin matrix,
Z represents the group of formula

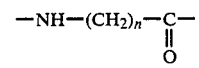

wherein $1 \leq n \leq 5$,
R represents a hydrogen atom or a methyl or ethyl radical,
m represents 0 or 1,
n' represents 0 to 3,
n" represents 0 to 3, and
$n' + n'' \leq 3$.

The polymeric resins carrying a carbonyl group in the form of a heterocycloalkanone group correspond to the general formula III:

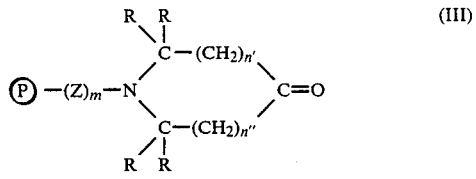

wherein:
Ⓟ represents a polymeric resin matrix,
Z represents the group of formula

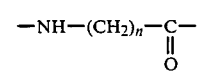

wherein $1 \leq n \leq 5$,

R represents a hydrogen atom or a methyl or ethyl radical, m represents 0 or 1, n' represents 0 to 3, n" represents 0 to 3, and n'+n"≦3.

In the polymeric resins corresponding to general formula II, the cycloalkanone group corresponding to the formula:

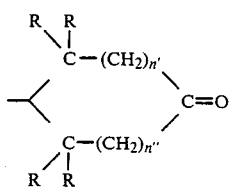

notably represents the radicals

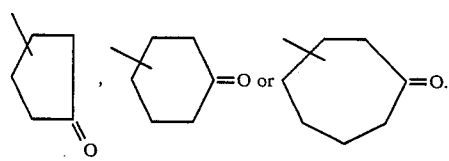

In the polymeric resins corresponding to general formula III, the heterocycloalkanone group corresponding to the formula:

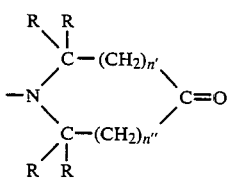

may notably be selected from among the following radicals:

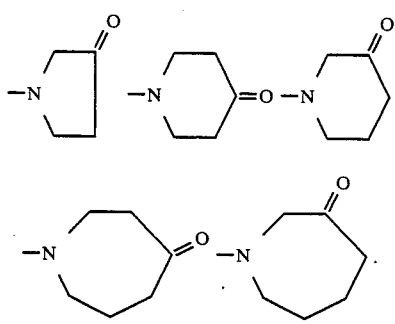

According to the present invention, the resin matrix ⓟ is advantageously of the polystyrene, polyacrylic or cellulose type. These matrices are advantageously cross-linked in order to produce a macroporous polymer or a gel which is in the form of, for example rigid resin grains or beads. The following symbols will be used hereinafter in order to designate the polymeric resin matrices ⓟ :

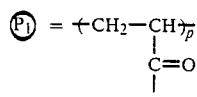

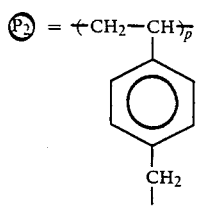

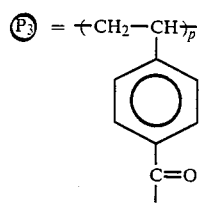

These different types of polymeric matrix ⓟ are advantageously cross-linked, for example with divinylbenzene or with an N,N'-bis-acryloyl-polymethylenediamine corresponding to the general formula (A):

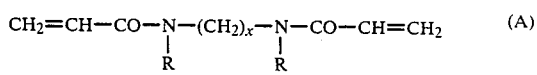

wherein:

x represents 1 to 6,

R represents H, —CH$_3$ or —CH$_2$—CH$_3$, or the two radicals R together form an alkylene group of formula —(CH$_2$)$_y$—, and y represents 1 to 4.

The following symbols, in particular will be adopted:
ⓟ$_{1a}$ = ⓟ$_1$ cross-linked with divinylbenzene
ⓟ$_{1b}$ = ⓟ$_1$ cross-linked with an N,N'-bis-acryloyl-polymethylene diamine corresponding to general formula (A) defined above
ⓟ$_2$ and ⓟ$_3$ are preferably cross-linked with divinylbenzene.

The various polymeric resins mentioned above may be obtained just as well by the polymerisation of monomers as by the functionalisation of a polymer.

The carbonyl polymeric resin may be prepared by the polymerisation of a monomer capable of generating by any known technique a carbonyl function. The reaction scheme of the preparation of a carbonyl polymeric resin according to the present invention, corresponding to formula IIIc or IIId, wherein m=0, n'=n"=1, and R=H will now be provided by way of example in the following. Thus, it is a polymeric resin, the matrix of which is of the polyacrylic type cross-linked with an N,N'-bis-acryloylpolymethylene diamine corresponding to the general formula (A) indicated above.

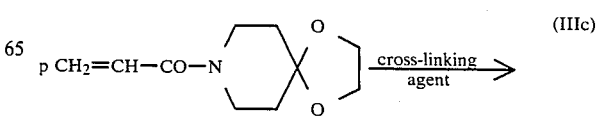

-continued

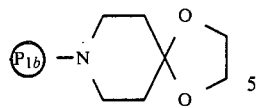

↓ H⊕

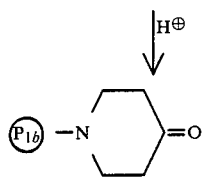

The carbonyl polymeric resins according to the present invention may also be prepared by grafting a carbonyl compound onto a polymerhaving a polyacrylic, a polystyrene or a cellulose matrix.

The activation of the polymers may be obtained by various known methods, for example in the case of polyacrylic resin, by the conversion of the carboxyl groups into acid chloride groups, or by the introduction of chloromethyl groups onto the aromatic nucleus of the polystyrene type of polymer. These activated polymers with a molecule carrying on the one hand the amine group, and on the other hand, a function capable of generating by any known process, a carbonyl function are then reacted. Thus, grafting is effected by the formation of a covalent bond of the amide or amine type.

It will be noted that the ketone function of the grafted molecule may be apparent, protected, for example in the form of a ketal, or it may be latent, for example in the form of secondary hydroxyl groups which are subsequently oxidized into a carbonyl group.

The carbonyl group which is responsible for the catalytic activity of the polymeric resin may be removed to a greater or lesser extent from the skeleton of the polymeric matrix by the insertion of an amino acid molecule corresponding to the formula $NH_2—(CH_{2n}—CO_2H$. In the above-mentioned general formulae, this amino acid appears under the designation Z.

It will be briefly recalled at this point that the capacity of specific groups of a catalytic resin may be expressed, for example in milliequivalents/g (meq/g). Within the scope of the present invention, the mention of a resin having a capacity of carbonyl sites of x meq/g signifies that one gram of resin contains $x.10^{-3}$ molar equivalent of group $>C=O$. In practice, it has been found that the capacity in the polymeric resin of carbonyl sites having a catalytic activity may advantageously be from 0.5 to 10 meq/g of polymer.

Some particular Examples of the preparation of ketonic catalysts by the chemical modification of polymeric resin matrix will now be provided by way of illustration in the following.

A.

Activation of the acrylic resin ⓟ$_{1a}$—OH

A mixture of acrylic resin (10 g; 0.10 equivalent), cross-linked with 30% of divinylbenzene, thionyl chloride (20 cm3; 0.27 mols), and anhydrous dimethylformamide (8 cm3), in 100 cm3 of anhydrous chloroform is heated to 60° C. for 6 hours with mechanical agitation. After filtration, the resin is washed successively with chloroform and anhydrous ether, and then dried under reduced pressure. Capacity of acid chloride groups: 5.0 meq/g. The resin which is used may consist, for example of a polyacrylic resin sold by the BIO-RAD laboratories under the name of Bio-Rex 70 (200–400 mesh). It is in the form of sodium salt and contains about 70% of water. It is freed from residual impurities and from water, preferably before any functionalisation, and it is removed in acid form.

B.

Preparation of resin IIIa (ⓟ = ⓟ$_{1a}$, m=O; n'=n''=1, R=H)

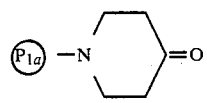

(IIIa)

The previous acid chloride resin (3.0 g; 0.015 equivalent) is added to a solution of 8-aza-1,4-dioxaspiro[4-5]decane (4.3 g; 0.030 mols) and triethylamine (1.6 g; 0.016 mols) in 65 cm3 of dimethylformamide. The mixture is agitated for 7 hours at ambient temperature. After filtration, the resin is washed with distilled water, then suspended and agitated for 3 hours in a mixture of dilute soda-dimethylformamide. After filtration, the resin is washed with distilled water and is suspended in 4N hydrochloric acid. The suspension is agitated for 6 hours at ambient temperature. After filtration, the resin is washed successively with distilled water, ethanol and ether, and then dried under reduced pressure. Capacity of carbonyl groups: 2.5 meq/g.

C.

Preparation of resin IIIb (ⓟ = ⓟ$_{1a}$, m=1, n=2, n'=n''=1, R=H)

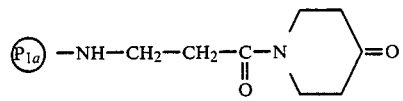

(IIIb)

The previous acid chloride resin (3.0 g; 0.015 equivalent) is added to a solution of β-alanine (5.35 g; 0.06 mols) in 36 cm3 of a mixture of DMF-water-N-ethyl morpholine ⅓/⅓/⅓. After agitating for 17 hours at ambient temperature, the mixture is filtered. The resin is washed successively with distilled water, dilute hydrochloric acid, water, ethanol and ether, and then dried under reduced pressure.

3.6 g of this resin are introduced, for a reaction, into a solution of thionyl chloride (8 cm3; 0.11 mols) and anhydrous dimethylformamide (3 cm3) in 40 cm3 of anhydrous chloroform. The mixture is heated to 60° C. for 6 hours with mechanical agitation. After filtration, the resin is washed successively with chloroform and anhydrous ether, and then dried under reduced pressure. Total capacity of acid chloride groups: 4.3 meq/g.

This resin (3.2 g; 0.014 equivalent) is added to a solution of 8-aza-1,4-dioxa-spiro[4-5]decane (4.5 g; 0.032 mols) and triethylamine (1.8 g; 0.018 mols) in 70 cm3 of dimethylformamide. The mixture is agitated for 9 hours at ambient temperature, and then filtered. The resin is washed with distilled water, suspended and agitated for 3 hours in a mixture of dilute soda-dimethylformamide.

After filtration, the resin is washed with distilled water, and suspended in 4N hydrochloric acid. This suspension is agitated for 6 hours at ambient temperature. After filtration, the resin is washed successively with distilled water, ethanol and ether, and then dried under reduced pressure. Capacity of carbonyl groups: 2.0 meq/g.

D.

Preparation of resin IIa ($\text{\textcircled{P}} = \text{\textcircled{P}}_{1a}$, m=0, n=n'=1, R=H)

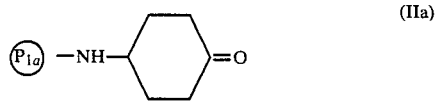
(IIa)

An acid chloride resin of capacity 3.8 meq/g (4.0 g; 0.015 equivalent) is added to a solution of 4-aminocyclohexanol (3.0 g; 0.026 mols) and triethylamine (2.9 g; 0.029 mols) in 60 cm3 of dimethylformamide. The mixture is agitated for 7 hours at ambient temperature and then filtered. The resin is washed successively with DMF, distilled water, ethanol and ether. After drying under reduced pressure, 1.0 g of resin thus obtained is oxidized in the following manner: it is added to a solution of chromic anhydride (0.9 g: $9.10^{-3}$ mols) in 40 cm$^3$ of dimethylformamide, containing a few drops of concentrated sulphuric acid. The mixture is agitated for 19 hours at ambient temperature and then filtered. The resin is washed successively with water, ethanol, a mixture of dilute soda-ethanol and then with water. It is then acidified by washes with dilute hydrochloric acid, followed by washes with distilled water, ethanol and ether. The resin which is dried under reduced pressure has a capacity of carbonyl groups of 1.2 meq/g.

E.

Preparation of resin Ia ($\text{\textcircled{P}} = \text{\textcircled{P}}_{1a}$, m=0, n'=0, R=Me, R'=H)

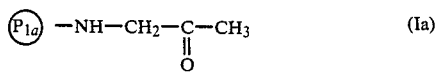
(Ia)

An acid chloride resin of capacity 3.8 meq/g (5.0 g; 0.019 equivalent) is added to a solution of 1-amino 2-propanol(2.3 g; 0.30 mols) and triethylamine (3.3 g; 0.030 mols) in 70 cm3 of dimethylformamide. The mixture is agitated for 7 hours at ambient temperature and then filtered. The resin is washed successively with DMF, distilled water, ethanol and ether. After drying under reduced pressure, oxidation is carried out: 5.9 g of the previous alcohol resin are added to a chromic anhydride solution (10 g, 0.1 mol) in 120 cm3 of dimethylformamide, containing a few drops of concentrated sulphuric acid. The mixture is agitated for 20 hours at ambient temperature and then filtered. The resin is washed successively with water, ethanol, a mixture of dilute soda-ethanol and then with water. It is then acidified by washes with dilute hydrochloric acid, followed by washes with distilled water, ethanol and ether. The resin which is dried under reduced pressure has a capacity of carbonyl groups of 0.85 meq/g.

An Example of the preparation of ketonic catalysts by polymerisation will now also be provided in the following.

Preparation of N-acryloyl 8-aza-1,4-dioxa-spiro[4-5]decane

A solution of 8-aza-1,4-dioxa-spiro[4-5]decane (28.6 g; 0.20 mols) in anhydrous ether (100 cm3) is agitated and cooled to 0° C. Acryloyl chloride (9.06 g; 0.10 mols) in solution in anhydrous ether (33 cm3) is added dropwise. Two hours after the beginning of the addition, the white precipitate is removed by filtration. By evaporating the ether under reduced pressure, the crude product is obtained (yield=97%) which is then distilled ($BP_{0.06}$=110°-114° C.) (yield=85%). F=43°-44° C. (pentane-ether).

Preparation of the copolymer of N-acryloyl 8-aza-1,4-dioxa-spiro[4-5]decane and of N,N'-methylenebisacrylamide (molar ratio 6:1)

Production of copolymer IIIc ($\text{\textcircled{P}} = \text{\textcircled{P}}_{1b}$, m=0, n'=n''=1, R=H)

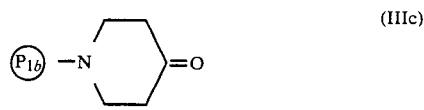
(IIIc)

A stream of nitrogen is passed for 15 minutes into a solution of N-acryloyl 8-aza-1,4-dioxa-spiro[4-5]decane (5.46 g; 0.028 mols) and N,N'-methylenebisacrylamide (0.71 g; 0.0046 mols) in distilled water (18 cm3). After adding a few milligrammes of potassium persulphate and riboflavin, the solution is subjected for 10 minutes to the radiation of a 500 watt lamp.

The resulting polymer is washed with water, ethanol and ether, and then dried under reduced pressure.

A suspension of the resulting polymer in 1N hydrochloric acid is then agitated for 24 hours. The polymer is recovered by filtration, washed with water, ethanol and with ether, then dried under reduced pressure. Its capacity of carbonyl groups is 4.0 meq/g.

Preparation of the copolymer of N-acryloyl 8-aza-1,4-dioxa-spiro[4-5]decane and of N,N'bis acryloyl piperazine (molar ratio 4.5:1).

Production of copolymer IIId ($\text{\textcircled{P}} = \text{\textcircled{P}}_{1b}$, m=0, n'=n''+1, R+H)

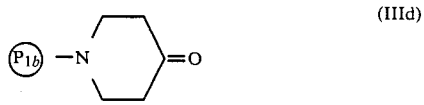
(IIId)

A stream of nitrogen is passed for 30 minutes into a solution of N-acryloyl 8aza-1,4-dioxa-spiro[4-5]decane (5 g; 0.025 mols) and of N,N'bis acryloyl piperazine (1.1 g; 0.0056 mols) in distilled water (14 cm3). The solution is cooled to 0° C., and 56 mg of ammonium persulphate, solubilized in distilled water (2 cm3), and 50 microliters of N,N'tetramethyl ethylene diamine (TEMED) are added. The mixture is maintained at 0° C. for 1½ hours. The resulting polymer is ground with a mortar, washed with water, ethanol and ether, and then dried under reduced pressure. A suspension of the copolymer in 1N hydrochloric acid is agitated for 24 hours. The polymer is recovered by filtration, washed with water and ethanol, then dried under reduced pressure. Its capacity of carbonyl groups is 4.2 meg/g.

Preparation of the copolymer of N-acryloyl 8-aza-1,4-dioxa-spiro[4-5]decane and of N,N'bis acryloyl piperazine in beads (molar ratio 5:1)

Production of copolymer IIIe ( 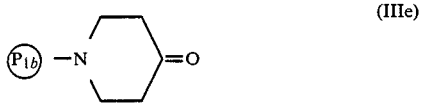, m=0, n'=n''=1, R=H)

In this Table, the operational conditions are as follows:
temperature of the reactor = 25° C.
concentration of α-aminopropionitrile at the input of the tubular reactor: 0.05 mol/l.
concentration of hydroxide: 0.02 mol/l.

TABLE A

Comparative study of the efficiency of different ketonic polymers (reactor containing 1.3 g of catalyst and 4.5 cm3 of solution)

| Ketonic polymer | Capacity in the polymer of carbonyl groups expressed in milli-equivalent per gram of catalyst | Contact time in the reactor in minutes | Conversion rate in percentage of α-aminopropionamide at the outlet of the reactor with respect to the injected α-aminopropionitrile |
|---|---|---|---|
| Ia (Ⓟ = Ⓟ$_{1a}$, m = 0, n'' = 0, R = Me, R' = H) | 0.85 | 66 | 26 |
|  |  | 33 | 14.5 |
|  |  | 14.6 | 6.8 |
| IIa (Ⓟ = Ⓟ$_{1a}$, m = 0, n = n' = 1, R = H) | 1.2 | 14.6 | 12 |
|  |  | 8.8 | 8.5 |
| IIIa |  | 33 | 77 |
|  |  | 14.6 | 34 |
| (Ⓟ = Ⓟ$_{1a}$, m = 0, n' = n'' = 1, R = H) | 1.5 | 8.8 | 25 |
|  |  | 6.2 | 17 |
| IIIb |  | 33 | 74 |
| (Ⓟ = Ⓟ$_{1a}$, m = 1, n = 2, n' = n'' = 1, R = H) | 2 | 14.6 | 33 |
|  |  | 6.2 | 14 |
| IIIc ou IIId |  | 33 | 99.8 |
| (Ⓟ = Ⓟ$_{1b}$, m = 0, n' = n'' = 1, R = H) | 3 | 14.6 | 93.4 |
|  |  | 8.8 | 80.6 |

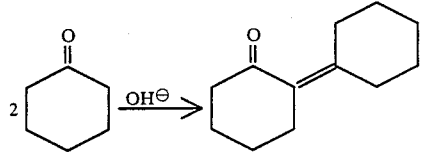

(IIIe)

100 ml of paraffin oil containing 2 drops of sorbitan trioleate are subjected to a stream of nitrogen for a period of 2 hours. A solution of N-acryloyl 8aza-1,4-dioxa-spiro[4-5]decane (1.8 g; 0.00915 mols) and of N,N'bis acryloyl piperazine (0.35 g; 0.00183 mols) in distilled water (7.5 cm3) is also subjected to a stream of nitrogen for 1 hour. 20 microliters of N,N'tetramethylethylene diamine (TEMED) and 25 mg of ammonium persulphate solubilized in distilled water (1 cm3) are then added to the aqueous solution. The aqueous solution is then poured into the paraffin oil, and then stirred for 1 hour under a nitrogen atmosphere. Thereafter, the polymer is filtered in the form of beads and is washed with pentane and then with distilled water.

The polymer which is obtained is agitated for 24 hours suspended in 1N hydrochloric acid. It is then recovered by filtration and washed with water. Its capacity of carbonyl groups is 4.1 meq/g.

The copolymers which have been described above must compulsorily be dried before proceeding with analytical characterisations. In the case of routine preparations, these operations may be dispensed with, since the water washes followed by drying suffice.

Efficiency of the catalysts

The efficiency of the ketonic polymeric resins according to the present invention was tested on various α-aminonitriles in a tubular reactor after having been conditioned by agitation in a solution of dilute soda. Some results relating to the hydration of α-amino-propionitrile will now be provided by way of example in the following Table A.

It should be recalled at this point that in the process relating to the chemical catalytic hydrolysis of α-aminonitriles in a homogeneous medium, cyclic ketones cannot be used, because they are rapidly degraded in a basic medium, notably by an aldolisation-crotonisation reaction. Thus, it was possible to observe the formation of cyclohexylidene-2-cyclohexanone during the hydration of the α-aminonitriles catalysed by cyclohexanone:

On the other hand, according to the process of the present invention, such secondary reactions between the ketonic molecules are more severely limited when they are immobilized on a polymeric matrix. In this respect, it will be noted that, in practice, cyclic ketones which have been insolubilized have appeared to be more efficient than linear aliphatic ketones.

In addition to the exact nature of the ketonic moiety having a catalytic activity, the physicochemical characteristics of the polymeric resin matrix (cross-linking agent, degree of cross-linking, more or less hydrophilic nature) occur in a notable manner, particularly due to the importance of the diffusion processes in heterogeneous catalysis. Since the nature of the catalyst polymer is fixed, the important parameters defining the conversion rate of α-aminonitrile into α-amino amide at the outlet of the reactor have been demonstrated.

Some of the results relating to the hydration of α-amino-propionitrile catalysed by the carbonyl polymer of formula IIIa, wherein Ⓟ = Ⓟ$_{1a}$, m=0, n=n'=1, R=H, i.e., the polymer corresponding to formula:

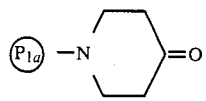

will now be mentioned in the following in an indicative manner.

These different parameters have been regrouped in the following Table B:

TABLE B

Hydration of α-aminopropionitrile into α-aminoproprionamide in a tubular reactor filled with catalyst IIIa (1.3 g of catalyst and 4.5 cm3 of solution) $((P) = (P_{1a}), m = 0, n' = n'' = 1, R = H)$. Indication of the important parameters

| Capacity in the polymer of carbonyl groups expressed in melliequivalents per gram of catalyst | Concentration of hydroxide in mol/liter | Concentration of α-amino-propionitrile at the inlet of the reactor in mol/liter | Contact time in the reactor in minutes | Temperature of the reactor (°C.) | Conversion rate in % of α-aminopropionamide at the outlet of the reactor with respect to the injected α-aminopropionitrile |
|---|---|---|---|---|---|
| 0 | 0.05 | 0.05 | 18 | 25 | 5 |
| 1.4 | " | " | " | " | 73.5 |
| 1.8 | " | " | " | " | 84.5 |
| 1.5 | 0.02 | 0.05 | 14.6 | 25 | 33.5 |
| " | 0.05 | " | " | " | 63.5 |
| " | 0.10 | " | " | " | 79 |
| " | 0.15 | " | " | " | 87 |
| 1.5 | 0.05 | 0.025 | 14.6 | 25 | 68.5 |
| " | " | 0.050 | " | " | 63.5 |
| " | " | 0.075 | " | " | 57.5 |
| " | " | 0.10 | " | " | 55 |
| 1.5 | 0.05 | 0.05 | 33 | 25 | 85 |
| " | " | " | 14.6 | " | 63.5 |
| " | " | " | 8.8 | " | 52 |
| " | " | " | 5.1 | " | 35 |
| 1.8 | 0.07 | 0.10 | 8.5 | 10 | 34 |
| 1.8 | " | " | " | 30 | 76 |
| 1.8 | " | " | " | 40 | 98 |

An examination of this Table shows that the conversion rate of α-aminonitrile into α-amino amide increases:

with the number of catalyst carbonyl sites per unit of polymer mass;

with the concentration of hydroxide ions in the reactor, with the temperature of the reactor, and with the residence time of α-aminonitrile in contact with the catalyst, for a given type of reactor and for a given concentration of α-aminonitrile, the conversion rate being an exponential function of the residence time.

During these experiments, it has appeared in particular that the insoluble ketonic polymer carries out its function of catalyst whatever the number of ketonic equivalents which are introduced. According to the present process, the solution of α-aminonitrile is preferably brought into contact with the insoluble carbonyl polymer in a proportion of from 0.1 to 50 equivalents of carbonyl compounds per mol of starting α-aminonitrile.

In practice, it has also been found that it is possible to introduce the polymeric resin into the reaction medium in a proportion of from about 10 g to about 2,000 g of resin per mol of starting α-aminonitrile, for example when the present process is carried out discontinuously, with recycling of the carbonyl catalyst.

Moreover, it has been found that the carbonyl polymeric resin could advantageously carry, in addition to side chains having a carbonyl group, hydrophilic functional groups, such as quaternary ammonium, primary, secondary or tertiary amine or carboxylic groups.

Finally, it is specified that the temperature of the reaction medium is substantially from about 5° to about 80° C.

The process, an object of the present invention, may be carried out in the following manner, for example. The ketonic polymeric resin, the residual carboxyl groups of which are in acid form, should preferably be previously conditioned. For example, it is agitated for several hours in 0.1N soda, before the column is filled with catalyst.

Two syringes of an identical diameter, operated by the same motor, feed the resin column at the same flow rate through its lower part. One of the syringes contains, for example α-aminonitrile hydrochloride in solution in dilute hydrochloric acid, and the other syringe contains a soda solution. At the inlet of the column, for example at the bottom, the soda solution releases the α-aminonitrile from its hydrochloride and brings the reaction medium to the pH required for the catalytic hydration.

In order to avoid the autocatalytic reaction which would modify the composition of the effluents before analysis, a solution of dilute hydrochloric acid is added at the outlet of the column.

According to a variant of the process, the α-aminonitrile may be prepared by the action of a cyanohydrin on ammonia. The starting α-aminonitrile may also be prepared by the action of an aldehyde and hydrocyanic acid or cyanide, such as an alkaline cyanide, on ammonia and an ammonium salt. In practice, it may be advantageous in a similar case to stabilize the solution of α-aminonitrile with an excess of from about 5 to 10% of cyanide with respect to the cyanide contained in the equimolar aldehydecyanide solution, or with respect to the cyanohydrin solution.

According to a variant of the present process, the formation equilibrium of the α-aminonitrile is allowed to adjust before the catalytic system is introduced, composed of carbonyl resin in the presence of hydroxide ions.

Some Examples to illustrate the process of the present invention will now be provided in the following.

EXAMPLE 1

A 0.10M solution of α-aminopropionitrile hydrochloride in 0.01N HCl is simultaneously injected with an identical volume of 0.21N soda into the head of a reactor containing 1.4 g of immobilized ketonic polymer IIIa having $1.8 \times 10^{-3}$ equivalents of ketonic group per gram of polymer. The α-amino-propionamide is obtained at the outlet of the reactor with a conversion rate of 95%. The productivity of the reactor operation at ambient temperature is $1.2 \times 10^{-3}$ mol/min, based on 1 liter of reactor and on 1 gram of resin.

EXAMPLE 2

A 0.10M solution of α-aminopropionitrile hydrochloride in 0.01N HCl is simultaneously injected with an identical volume of 0.21N soda into the head of a reactor containing 1.5 g of immobilized ketonic polymer IIIa with $1.2 \times 10^{-3}$ equivalents of ketonic group per gram of polymer. The α-amino-propionamide is obtained at the outlet of the reactor with a conversion rate of 90%. The productivity of the reactor operating at 30° C. is $0.55 \times 10^{-3}$ mol/min, based on 1 liter of reactor and on 1 g of resin.

EXAMPLE 3

4 ml of 1N soda, and 1 g of the insoluble ketonic polymer IIIa with 1.8 milliequivalents per gram are added to 20 ml of a 0.2 molar solution of α-aminonitrile, and the mixture is then agitated for 1 hour at ambient temperature. After neutralisation with hydrochloric acid and after centrifugation of the heterogeneous mixture, an NMR analysis of the supernatant shows that the conversion rate of the α-aminopropionitrile into α-amino amide is 91%.

EXAMPLE 4

A 0.10M solution of α-aminomethylmercaptobutyronitrile hydrochloride in 0.01N HCl is simultaneously injected with an identical volume of 0.21N soda into the head of a reactor containing 1.4 g of immobilized ketonic polymer IIIa with $1.8 \times 10^{-3}$ equivalents of ketonic group per gram of polymer. α-aminomethylmercaptobutyramide is obtained at the outlet of the reactor with a conversion rate of 95%. The productivity of the reactor operating at ambient temperature of $0.57 \times 10^{-3}$ mols/minute, based on 1 liter of reactor and 1 gram of resin.

EXAMPLE 5

0.866 g of acetaldehyde ($2 \times 10^{-2}$ mols) are added to 100 ml of a solution of 5N NH$_4$OH containing 1.284 g of NH$_4$Cl (0.0240 mols) and 1.432 g of KCN (0.0220 mols). The mixture is maintained in a stoppered flask at 40° C. for ½ hour. This mixture, simultaneously with an identical volume of a 0.1N soda solution is injected into the head of a reactor containing 1.4 g of immobilized ketonic polymer IIIa with $1.8 \times 10^{-3}$ equivalents of ketonic groups per gram of polymer. α-amino amide is obtained at the outlet of the reactor with a conversion rate of 95%. Under these conditions, the productivity of the reactor operating at ambient temperature is $1.0 \times 10^{-3}$ mol/min based on 1 liter of reactor and 1 gram of resin.

10 ml of normal soda are added to the reaction mixture which has issued from the reactor, in order to obtain an equimolarity of the hydroxide ions and the α-amino amide. The mixture is then heated to 80° C. in the open air for ½ hour. The determination of alanine by an amino acid analyser indicates a yield of 90%.

EXAMPLE 6

2.032 g (about $2 \times 10^{-2}$ mols) of methylmercaptopropionaldehyde are added to 100 ml of a solution 0.22 molar in NH$_4$Cl and 0.22 molar in KCH, in 10N NH$_4$OH. The mixture is heated to 40° C. with magnetic agitation in a stoppered Erlenmeyer flask for 1½ hours. This mixture, simultaneously with an identical volume of a 0.1N soda solution is injected into the head of a reactor containing 1.4 g of immobilized ketonic polymer IIIa with $1.8 \times 10^{-3}$ equivalents of ketonic group per gram of polymer. α-amino amide is obtained at the outlet of the reactor with a conversion rate of 95% measured by high pressure liquid chromatography. Under these conditions, the productivity of the reactor operating at 25° C. is $0.52 \times 10^{-3}$ mol/min, based on 1 liter of reactor and on 1 gram of resin.

10 ml of 1N soda are added to the reaction mixture which has issued from the reactor, in order to obtain an equimolarity of the hydroxide ions and the α-amino amide. The mixture is then heated to 80° in the open air for 1 hour. The determination of methionine by the NNR method indicates a yield of 95%.

EXAMPLE 7

A 0.05M solution of α-aminopropionitrile hydrochloride in 0.01N HCl is simultaneously injected with an identical volume of 0.11N soda into the head of a reactor containing 1.3 g of immobilized ketonic polymer IIIb with $2.0 \times 10^{-3}$ equivalents of ketonic group per gram of polymer. α-aminopropionamide is obtained at the outlet of the reactor with a conversion rate of 85%. The productivity of the reactor operating at ambient temperature is $0.49 \times 10^{-3}$ mol/min, based on 1 liter of reactor and on 1 gram of resin.

EXAMPLE 8

A 0.10M solution of α-aminopropionitrile hydrochloride in 0.01N HCl is simultaneously injected with an identical volume of 0.15N soda into the head of a reactor containing 1.3 g of immobilized ketonic polymer IIIc with $3.0 \times 10^{-3}$ equivalents of ketonic group per gram of polymer. α-aminopropionamide is obtained at the outlet of the reactor with a conversion rate of 99.1%. The productivity of the reactor operating at ambient temperature is $1.53 \times 10^{-3}$ mol/min, based on 1 liter of reactor and on 1 gram of resin.

EXAMPLE 9

A 0.10M solution of α-aminopropionitrile hydrochloride in 0.01N HCl is simultaneously injected with an identical volume of 0.2N soda into the head of a reactor containing 3.3 g of immobilized ketonic polymer Ia with $0.85 \times 10^{-3}$ equivalent of ketonic group per gram of polymer. α-aminopropionamide is obtained at the outlet of the reactor with a conversion rate of 35%. The productivity of the reactor operating at ambient temperature is $8 \times 10^{-5}$ mol/min, based on 1 liter of reactor and on 1 gram of resin.

EXAMPLE 10

80 mg of α-aminopropionitrile hydrochloride are added to a suspension of 1.50 grams of ketonic polymer IIId, with $2.6 \times 10^{-3}$ equivalents of ketonic groups per gram of polymer in 15 cm3 of a 0.20N soda solution.

The mixture is agitated for 10 minutes at 20° C. After neutralisation using hydrochloric acid, and after centrifugation, NMR analysis of the supernatant shows a conversion rate of 97% into α-aminopropionamide.

Of course, the present invention is not restricted to the particular embodiments of the process which has been described, but it is quite possible, without thereby exceeding the scope of the present invention, to conceive some variants of detail. Thus, in particular it will be possible to make some modifications relating to the structure and to the physicochemical properties of the carbonyl polymeric resin.

We claim:

1. A process for the catalytic hydrolysis of a compound selected from α-aminonitriles and salts thereof to form the corresponding α-amino amide, α-amino acid or salt thereof, which process comprises reacting said compound in an aqueous medium, in a heterogeneous phase and in the presence of hydroxide ions, on a polymeric resin catalyst which contains side chains carrying a carbonyl group and which is insoluble in the aqueous basic medium.

2. A process according to claim 1, wherein said polymeric resin carrying side chains having a carbonyl group corresponds to the following general formula:

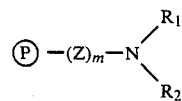

wherein:
- Ⓟ represents a polymeric resin matrix,
- Z represents a group of the formula

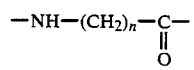

wherein $1 \leq n \leq 5$,
m is selected from 0 and 1,
$R_1$ represents a hydrogen atom,
$R_2$ is selected from a cycloalkanone group having from 4 to 7 members and optionally containing from 1 to 3 heteroatoms, and a group of the formula:

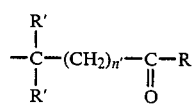

wherein:
R' is selected from a hydrogen atom and methyl and ethyl radicals,
R is selected from methyl and ethyl radicals, and
n' represents 0 to 3,
or $R_1$ and $R_2$, together with the adjacent nitrogen atom, form a cycloalkanone group having from 5 to 7 members, optionally containing 1 or 2 additional heteroatoms, and optionally being substituted by at least one methyl or ethyl radical.

3. A process according to claim 2, wherein said heteroatoms are nitrogen.

4. A process according to claim 1, wherein said polymeric resin carrying side chains having a carbonyl group corresponds to the general formula (I):

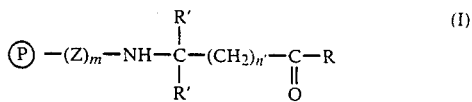

wherein:
- Ⓟ represents a polymeric resin matrix,
- Z represents a group of the formula

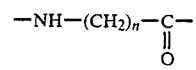

wherein $1 \leq n \leq 5$,
R' is selected from a hydrogen atom and methyl and ethyl radicals,
R is selected from methyl and ethyl radicals,
m is selected from 0 and 1, and
n' represents 0 to 3.

5. A process according to claim 1, wherein said polymeric resin carrying side chains having a carbonyl group corresponds to the general formula (II):

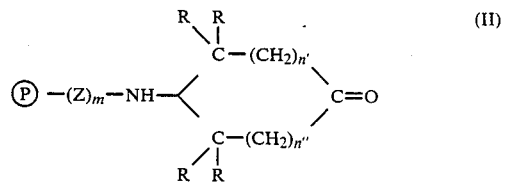

wherein:
- Ⓟ represents a polymeric resin matrix,
- Z represents a group of the formula

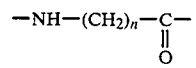

wherein $1 \leq n \leq 5$,
R is selected from a hydrogen atom and methyl and ethyl radicals,
m is selected from 0 and 1,
n' represents 0 to 3,
n'' represents 0 to 3, and
$n' + n'' \leq 3$.

6. A process according to claim 1, wherein said polymeric resin carrying side chains having a carbonyl group corresponds to the general formula (III):

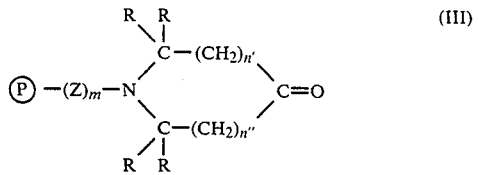

wherein:
- Ⓟ represents a polymeric resin matrix,
- Z represents a group of the formula

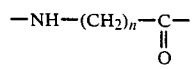

wherein $1 \leq n \leq 5$,

R is selected from a hydrogen atom and methyl and ethyl radicals, m is selected from 0 and 1, n' represents 0 to 3, n" represents 0 to 3, and n'+n"≦3.

7. A process according to claim 5, wherein said polymeric resin corresponds to the general formula (II), wherein the cycloalkanone group of the formula

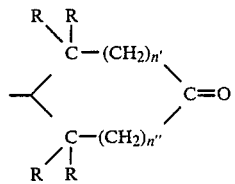

is selected from the radicals

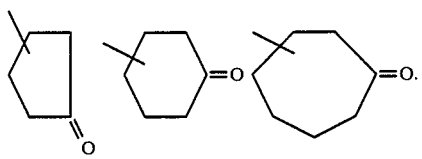

8. A process according to claim 6, wherein said polymeric resin corresponds to the general formula (III), wherein the heterocycloalkanone group of formula:

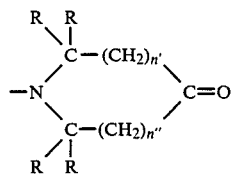

is selected from among the radicals

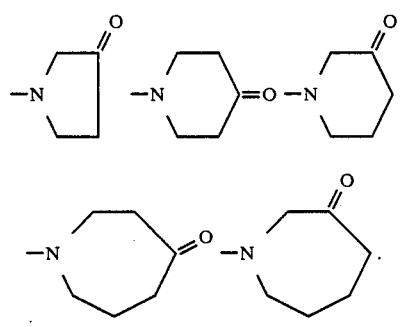

9. A process according to claim 2, wherein the polymeric resin matrix Ⓟ is selected from polystyrene, polyacrylic and cellulose type resins.

10. A process according to claim 9, wherein the polymeric resin matrix Ⓟ is selected from cross-linked polystyrene and polyacrylic type resins.

11. A process according to claim 10, wherein the polymeric resin matrix Ⓟ is a polyacrylic resin of the formula:

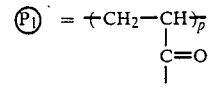

which is cross-linked in particular with divinylbenzene or with an N,N'-bisacryloyl polymethylene diamine corresponding to the general formula (A):

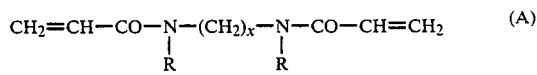

wherein x represents 1 to 6,

R is selected from H, —CH$_3$ and —CH$_2$—CH$_3$ or the two radicals R together form an alkylene group of the formula —CH$_2$—$_y$, and y represents 1 to 4.

12. A process according to claim 10, wherein the polymeric resin matrix Ⓟ is a polystyrene resin of the formula:

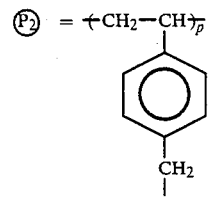

which is cross-linked, in particular with divinylbenzene.

13. A process according to claim 10, wherein the polymeric resin matrix Ⓟ is a resin of the formula:

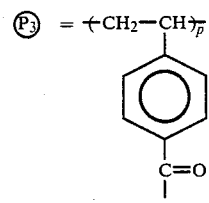

which is cross-linked, in particular with divinylbenzene.

14. A process according to claim 1, wherein said polymeric resin carries hydrophilic functional groups in addition to the side chains having a carbonyl group.

15. A process according to claim 14, wherein said hydrophilic functional groups are selected from quaternary ammonium, primary, secondary and tertiary amine and carboxylic groups.

16. A process according to claim 1, wherein the capacity of said polymeric resin of terminal carbonyl sites having a catalytic activity is from about 0.5 to 5 milliequivalents per gram of polymer.

17. A process according to claim 1, wherein said polymeric resin is introduced into the reaction medium in a proportion of from about 10 to about 2,000 g of resin per mol of starting α-aminonitrile.

18. A process according to claim 1, wherein the solution of α-aminonitrile is brought into contact with said immobilized polymeric resin in a reactor, in a proportion of from about 0.1 to about 50 equivalents of corresponding carbonyl compounds per mol of starting α-aminonitrile.

19. A process according to claim 1, wherein the temperature of the reaction medium is substantially from 5° to 80° C.

20. A process according to claim 1, wherein the hydroxide ions are introduced into the aqueous reaction medium in a small quantity, in a proportion of from about 0.1 to about 0.3 mols per mol of starting α-aminonitrile, and the corresponding α-amino amide which is obtained is extracted.

21. A process according to claim 1, wherein the hydroxide ions are introduced into the aqueous reaction medium in order to substantially obtain an equimolarity with respect to the starting α-aminonitrile, and the corresponding α-amino acid which is obtained is extracted.

22. A process according to claim 1, wherein the hydroxide ions are introduced into the reaction medium in a form selected from alkali metal and alkaline earth metal hydroxides and ammonium hydroxide.

23. A process according to claim 1, wherein the aqueous reaction medium has a minimum water content corresponding to 1 mol of water per mol of starting α-aminonitrile.

24. A process according to claim 1, wherein the chemical catalytic hydrolysis is carried out in the heterogeneous phase of an α-aminonitrile corresponding to the general formula

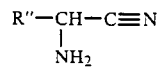

wherein
the radical R" is selected from a hydrogen atom and linear and branched hydrocarbon chains containing from 1 to 12 carbon atoms, and optionally at least one heteroatom, such as sulphur, said radical R" optionally being mono- or poly-substituted, preferably at the end of the chain, by groups such as hydroxy, amino, carboxyl, phenyl, hydroxyphenyl, carboxamide, indolyl, iminazyl and guanidyl groups, or R" forms, with the nitrogen atom in the α-position, a saturated heterocyclic group containing at least one heteroatom, such as nitrogen, said heterocyclic group optionally itself being substituted, for example by a hydroxy group, or the chemical catalytic hydrolysis is carried out of one of the salts thereof, such as a hydrochloride.

25. A process according to claim 1, wherein the salt of the α-aminonitrile is the hydrochloride.

26. A process according to claim 1, wherein the α-aminonitrile is prepared by the action of an aldehyde and hydrocyanic acid or cyanide, such as an alkaline cyanide, or ammonia and an ammonium salt.

27. A process according to claim 26, wherein the formation equilibrium of α-aminonitrile is allowed to adjust before it is brought into contact with said polymeric resin.

28. A process according to claim 26, wherein the α-aminonitrile solution is stabilized with an excess of from 5 to 10% of cyanide with respect to the cyanide contained in the equimolar aldehydecyanide solution or with respect to the cyanohydrin solution.

* * * * *

UNITED STATES PATENT AND TRADEMARK OFFICE
CERTIFICATE OF CORRECTION

PATENT NO. : 4,851,576
DATED : July 25, 1989
INVENTOR(S) : Commeyras et al.

It is certified that error appears in the above-identified patent and that said Letters Patent is hereby corrected as shown below:

In the title, "AFFECTING" should read -- EFFECTING --.

Signed and Sealed this

First Day of January, 1991

Attest:

HARRY F. MANBECK, JR.

*Attesting Officer*  *Commissioner of Patents and Trademarks*